United States Patent
Xue et al.

(10) Patent No.: US 8,345,670 B1
(45) Date of Patent: Jan. 1, 2013

(54) CALL TRANSFER DETERMINATION BASED ON A GEOGRAPHIC AREA SERVED BY A COMMUNICATION NETWORK

(75) Inventors: Wen Xue, Overland Park, KS (US);
Talat Jamshidi, Leawood, KS (US);
Pierce Andrew Gorman, Lee's Summit, MO (US); Simon Peter Vandervelde, Olathe, KS (US); Trey A. Hilyard, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 241 days.

(21) Appl. No.: 12/778,764

(22) Filed: May 12, 2010

(51) Int. Cl.
*H04L 12/66* (2006.01)

(52) U.S. Cl. .......................... 370/352; 370/353; 370/467

(58) Field of Classification Search .................. 370/352, 370/353, 356, 396
See application file for complete search history.

(56) References Cited

U.S. PATENT DOCUMENTS

| | | | |
|---|---|---|---|
| 5,550,912 A | 8/1996 | Akinpelu et al. | |
| 6,389,291 B1 | 5/2002 | Pande et al. | |
| 6,427,120 B1 | 7/2002 | Garin et al. | |
| 6,490,347 B2 | 12/2002 | DeCaluwe et al. | |
| 6,687,245 B2 | 2/2004 | Fangman et al. | |
| 6,963,635 B1 | 11/2005 | Jones | |
| 7,016,343 B1 | 3/2006 | Mermel et al. | |
| 7,031,714 B1 | 4/2006 | Rayburn | |
| 7,068,647 B2 | 6/2006 | Fangman et al. | |
| 7,228,134 B2 | 6/2007 | Gandhi et al. | |
| 7,239,629 B1 * | 7/2007 | Olshansky et al. | 370/353 |
| 7,499,702 B2 * | 3/2009 | Rubenstein | 455/428 |
| 7,616,643 B2 * | 11/2009 | Delaney et al. | 370/395.5 |
| 7,630,372 B1 * | 12/2009 | Androski et al. | 370/392 |
| 7,738,488 B2 * | 6/2010 | Marsico et al. | 370/466 |
| 7,843,901 B2 * | 11/2010 | Silver et al. | 370/352 |
| 8,027,335 B2 * | 9/2011 | Ansari et al. | 370/353 |
| 8,036,651 B1 * | 10/2011 | Manroa et al. | 455/422.1 |
| 8,060,655 B1 * | 11/2011 | Winebrenner et al. | 709/249 |
| 8,072,967 B2 * | 12/2011 | Rosenberg et al. | 370/352 |
| 8,135,397 B1 * | 3/2012 | Lall et al. | 455/425 |
| 8,161,540 B2 * | 4/2012 | Mantripragada et al. | 726/13 |
| 2004/0259528 A1 | 12/2004 | Gandhi et al. | |
| 2006/0140174 A1 | 6/2006 | Yeom | |
| 2006/0209807 A1 | 9/2006 | Lor et al. | |
| 2008/0013462 A1 | 1/2008 | Ye et al. | |
| 2009/0109896 A1 | 4/2009 | Rashid et al. | |

* cited by examiner

*Primary Examiner* — Robert Wilson
*Assistant Examiner* — Brian O Connor (57) ABSTRACT

A call control system to route a voice over internet protocol call between a wireless communication device and a destination device comprises a communication interface and a processing system, wherein the destination device is located in a geographic area served by a communication network. The communication interface is configured to receive an authorization response from an authorization system located in a home wireless network of the wireless communication device, wherein the authorization response comprises a destination identifier of the destination device and a location identifier of the wireless communication device. The processing system is configured to process the destination identifier and the location identifier to determine if the wireless communication device is located in the geographic area, and if so, the processing system is configured to direct the communication interface to transfer the call over a source port associated with the geographic area served by the communication network.

20 Claims, 6 Drawing Sheets

CALL TRANSFER DETERMINATION BASED ON A GEOGRAPHIC AREA SERVED BY A COMMUNICATION NETWORK

TECHNICAL BACKGROUND

Conventional telecommunication networks typically include many calling areas to cover a particular geographic area, with communication trunks used to transfer calls between different calling areas. These communication trunks and calling areas can be operated by different companies, or exchange carriers, with some communication trunks used to interconnect different calling areas, often over long distances.

Voice over Internet Protocol (VoIP) technology allows phone calls to be routed over packet networks, such as the Internet, instead of over the calling areas and trunks of conventional telecommunication networks. Wireless communication devices operating in wireless communication networks are also able to place calls using VoIP technology. For example, some calls initiated by wireless communication devices may use VoIP to connect to other wireless communication devices, or to non-wireless telecommunication devices, such as conventional telephones communicating over the public switched telephone network (PSTN).

Typically, a wireless call into the PSTN uses commercial mobile radio service (CMRS) trunks for local calls and feature group D (FG-D) trunks for long distance calls. However, when a call from a wireless communication device traverses a packet network, some information about the call may be lost during transmission. As a result, routing the call becomes more difficult and can lead to inefficient or undesirable routing, especially when interacting with conventional circuit-switched communication trunks and calling areas.

Overview

A call control system to route a voice over internet protocol call between a wireless communication device and a destination communication device comprises a communication interface and a processing system, wherein the destination communication device is located in a geographic area served by a communication network. The communication interface is configured to receive an authorization response from an authorization system located in a home wireless network of the wireless communication device, wherein the authorization response comprises a destination identifier of the destination communication device and a location identifier of the wireless communication device. The processing system is configured to process the destination identifier and the location identifier to determine if the wireless communication device is located in the geographic area served by the communication network. If the wireless communication device is located in the geographic area served by the communication network, the processing system is configured to direct the communication interface to transfer the call over a source port associated with the geographic area served by the communication network.

A method of operating a call control system to route a voice over internet protocol call between a wireless communication device and a destination communication device is disclosed, wherein the destination communication device is located in a geographic area served by a communication network. The method comprises receiving an authorization response from an authorization system located in a home wireless network of the wireless communication device, wherein the authorization response comprises a destination identifier of the destination communication device and a location identifier of the wireless communication device, processing the destination identifier and the location identifier to determine if the wireless communication device is located in the geographic area served by the communication network, and if the wireless communication device is located in the geographic area served by the communication network, transferring the call over a source port associated with the geographic area served by the communication network.

DETAILED DESCRIPTION

The following description and associated drawings teach the best mode of the invention. For the purpose of teaching inventive principles, some conventional aspects of the best mode may be simplified or omitted. The following claims specify the scope of the invention. Some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
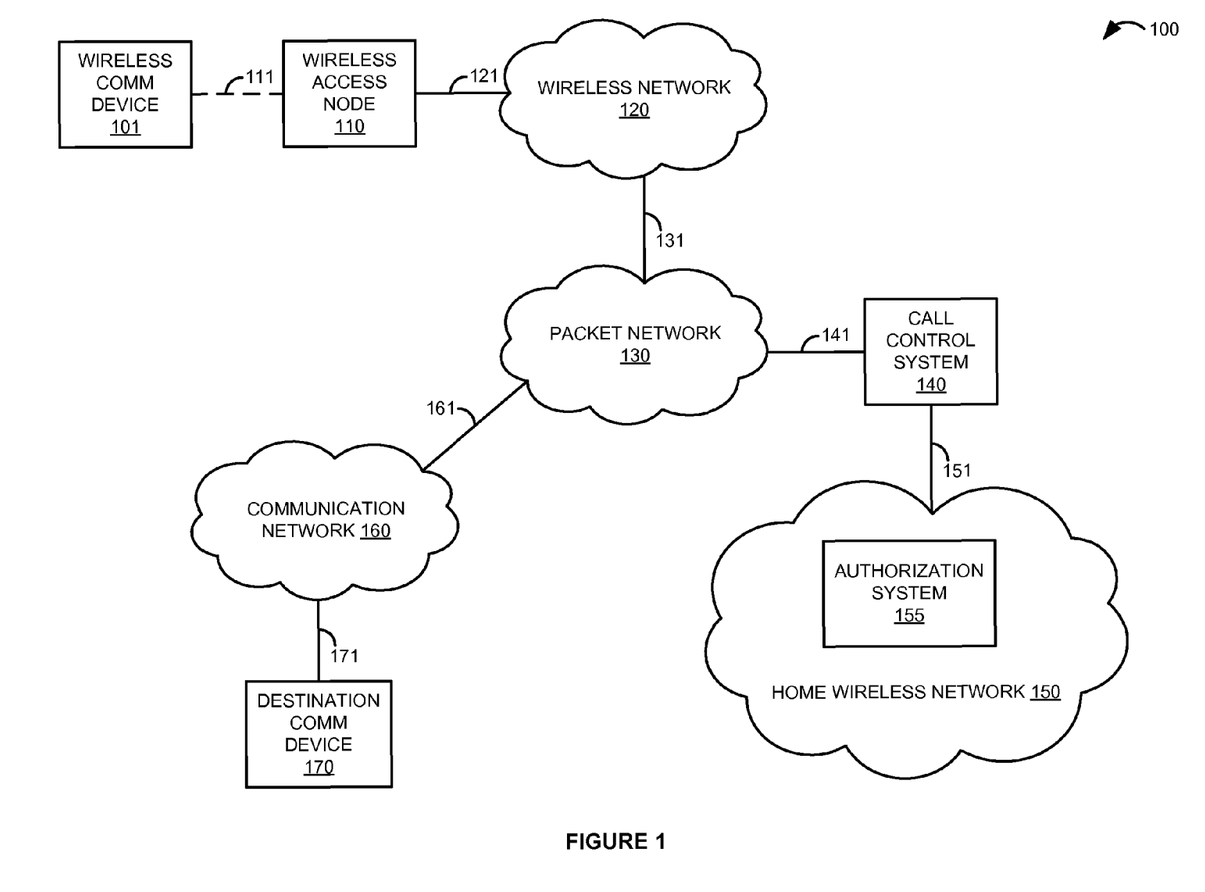
FIG. 1 is a block diagram that illustrates a communication system.

FIG. 1 is a block diagram that illustrates communication system 100. Communication system 100 includes wireless communication device 101, wireless access node 110, wireless network 120, packet network 130, call control system 140, home wireless network 150, communication network 160, and destination communication device 170. Home wireless network 150 includes authorization system 155. Wireless communication device 101 communicates with wireless access node 110 over wireless communication link 111. Wireless access node 110 is in communication with wireless network 120 over communication link 121. Wireless network 120 communicates with packet network 130 over communication link 131. Packet network 130 is in communication with call control system 140 over communication link 141. Call control system 140 communicates with home wireless network 150 over communication link 151. Packet network 130 is also in communication with communication network 160 over communication link 161. Communication network 160 communicates with destination communication device 160 over communication link 171.

Figure 2:
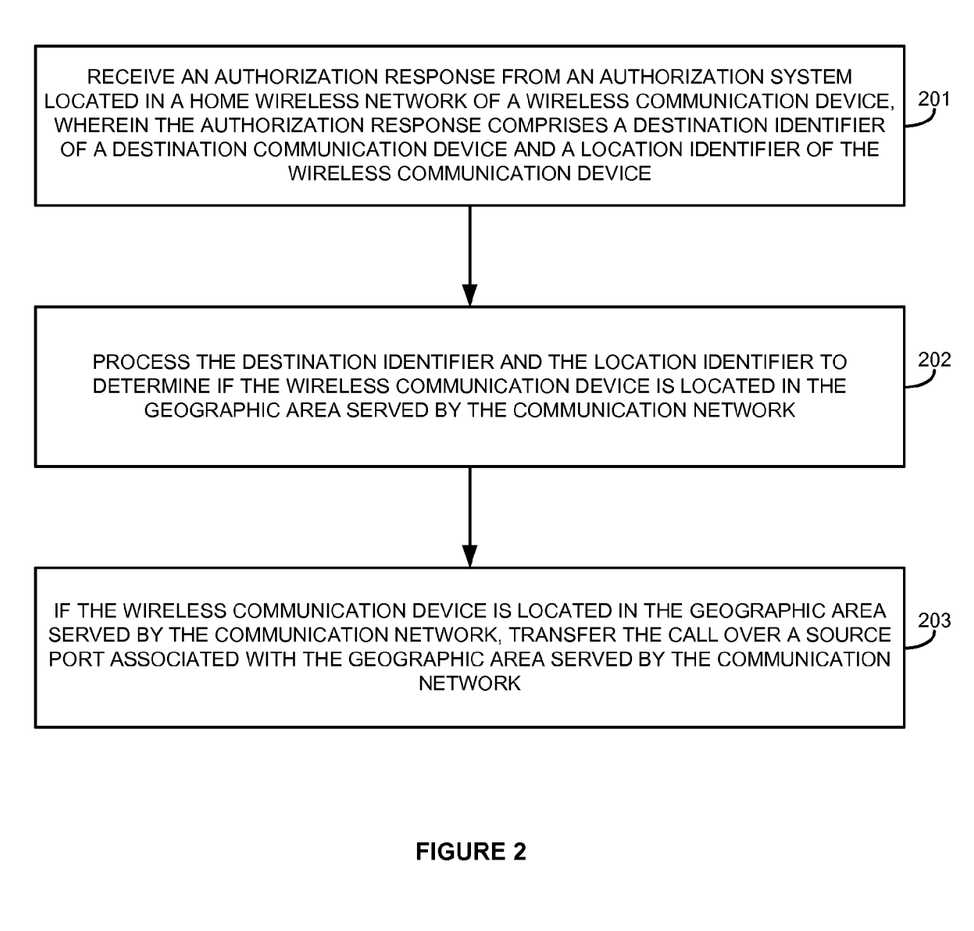
FIG. 2 is a flow diagram that illustrates an operation of the communication system.

FIG. 2 is a flow diagram that illustrates an operation of communication system 100. In particular, the operation shown in FIG. 2 depicts a method of operating call control system 140 to route a voice over internet protocol (VoIP) call between wireless communication device 101 and destination communication device 170, wherein destination communication device 170 is located in a geographic area served by communication network 160.

In FIG. 2, call control system 140 receives an authorization response from authorization system 155 located in a home wireless network 150 of wireless communication device 101 (201). Typically, call control system 140 receives the authorization response from authorization system 155 in response to an authorization request for wireless communication device 101 transferred from call control system 140 to authorization system 155. The authorization response could comprise any message in any protocol, but in some examples, authorization system 155 transfers the authorization response for delivery to call control system 140 in a remote authentication dial in user service (RADIUS) response message, such as an Access-Accept message in the RADIUS networking protocol. In other examples, call control system 140 receives the authorization response from authorization system 155 in a diameter response message, such as an AA-Answer or a Diameter-EAP-Answer in the diameter networking protocol.

The authorization response comprises a destination identifier of destination communication device 170 and a location identifier of wireless communication device 101 (201). The destination identifier could comprise any information that identifies destination communication device 170, such as a telephone number or any portion thereof (i.e. NPA-NXX), packet address, Electronic Serial Number (ESN), Mobile Station Identifier (MSID), Mobile Equipment Identifier (MEID), network address, called number field of a call signaling message, or some other identifier that uniquely identifies destination communication device 170. The location identifier comprises any information that uniquely identifies the location of wireless communication device 101. For example, the location identifier could comprise an identifier of a wireless access node 110, a mobile switching center (MSC), or some other network element associated with wireless network 120 serving wireless communication device 101, global positioning system (GPS) coordinates of wireless communication device 101, trunk group identifier, or any other information that indicates the location of wireless communication device 101.

Call control system 140 processes the destination identifier and the location identifier to determine if wireless communication device 101 is located in the geographic area served by communication network 160 (202). Typically, call control system 140 accesses a database that relates destination identifiers to location identifiers to determine if wireless communication device 101 is located in the geographic area served by communication network 160. For example, a list of related destination and location identifiers could be stored in a table, and call control system 140 looks up the destination identifier of destination communication device 170 in the table to determine if the destination identifier is associated with the location identifier of wireless communication device 101. In some examples, call control system 140 processes a network address of destination communication device 170 and an identifier of wireless access node 110 serving wireless communication device 101 to determine if wireless access node 110 is associated with the geographic area served by communication network 160 serving destination device 170. In other examples, call control system 140 processes the called number associated with the call and an identifier of an MSC serving wireless communication device 101 to determine if the MSC is associated with the geographic area served by communication network 160.

If wireless communication device 101 is located in the geographic area served by communication network 160, call control system 140 transfers the call over a source port associated with the geographic area served by communication network 160 (203). For example, a predetermined source port of call control system 140 may be associated with the geographic area served by communication network 160 to inform other network elements in packet network 130 that wireless communication device 101 is located in the geographic area served by communication network 160 that serves destination communication device 170. In some examples, different source ports of call control system 140 may be associated with different geographic areas served by different communication networks. However, call control system 140 may also use the same designated source port to transfer calls initiated by wireless communication device 101 when device 101 is located in the geographic area served by any communication network serving destination communication device 170. In some examples, if wireless communication device 101 is located in the geographic area served by communication network 160, call control system 140 includes the location identifier in a carrier identification code associated with the call.

Advantageously, when call control system 140 determines that wireless communication device 101 is located in a geographic area served by communication network 160, this information is preserved and conveyed to elements within packet network 130 by call control system 140 transferring the call on a source port associated with the geographic area served by communication network 160. Network elements in packet network 130 can then determine whether the call can be routed locally based on the source port that the call is transferred on by call control system 140. In this manner, the call may be routed to destination device 170 over the appropriate local or long distance trunks based on the source port of call control system 140 on which the call is transferred.

Referring back to FIG. 1, wireless communication device 101 may comprise any device having wireless communication connectivity with hardware and circuitry programmed to function as a telecommunications device, such as Radio Frequency (RF) communication circuitry and an antenna. The RF communication circuitry typically includes an amplifier, filter, modulator, and signal processing circuitry. Wireless communication device 101 may also include a user interface, memory device, software, processing circuitry, or some other communication components. For example, wireless communication device 101 could comprise a telephone, transceiver, mobile phone, cellular phone, smartphone, computer, personal digital assistant (PDA), e-book, game console, mobile Internet device, wireless network interface card, media player, or some other wireless communication apparatus—including combinations thereof. Wireless network protocols that may be utilized by wireless communication device 101 include Code Division Multiple Access (CDMA) 1xRTT, Global System for Mobile communications (GSM), Universal Mobile Telecommunications System (UMTS), High-Speed Packet Access (HSPA), Evolution-Data Optimized (EV-DO), EV-DO rev. A, Third Generation Partnership Project Long Term Evolution (3GPP LTE), Worldwide Interoperability for Microwave Access (WiMAX), IEEE 802.11 protocols (Wi-Fi), Bluetooth, Internet, telephony, or any other wireless network protocol that facilitates communication between wireless communication device 101 and wireless access node 110.

Wireless access node 110 comprises RF communication circuitry and an antenna. The RF communication circuitry typically includes an amplifier, filter, RF modulator, and signal processing circuitry. Wireless access node 110 may also comprise a router, server, memory device, software, processing circuitry, cabling, power supply, network communication interface, structural support, or some other communication apparatus. Wireless access node 110 could comprise a base station, Internet access node, telephony service node, wireless data access point, or some other wireless communication system—including combinations thereof. Some examples of wireless access node 110 include a base transceiver station (BTS), base station controller (BSC), radio base station (RBS), Node B, enhanced Node B (eNode B), and others. Wireless network protocols that may be utilized by wireless access node 110 include CDMA, GSM, UMTS, HSPA, EV-DO, EV-DO rev. A, 3GPP LTE, WiMAX, Wi-Fi, Bluetooth, Internet, telephony, or some other communication format—including combinations thereof.

Wireless network 120 comprises the core network of a wireless communication provider, and could include routers, gateways, telecommunication switches, servers, processing systems, or other communication equipment and systems for providing communication and data services. Likewise, home wireless network 150 comprises the core network of a wireless communication provider, and could include routers, gateways, telecommunication switches, servers, processing systems, or other communication equipment and systems for providing communication and data services. Wireless networks 120 and 150 could comprise wireless communication nodes, telephony switches, Internet routers, network gateways, computer systems, communication links, or some other type of communication equipment—including combinations thereof. Wireless networks 120 and 150 may also comprise optical networks, asynchronous transfer mode (ATM) networks, packet networks, radio access networks (RAN), metropolitan-area networks (MAN), or other network topologies, equipment, or systems—including combinations thereof. Wireless networks 120 and 150 may be configured to communicate over metallic, wireless, or optical links. Wireless networks 120 and 150 may be configured to use time-division multiplexing (TDM), Internet Protocol (IP), Ethernet, optical networking, wireless protocols, communication signaling, or some other communication format—including combinations thereof. In some examples, wireless networks 120 and 150 include further access nodes and associated equipment for providing communication services to many wireless communication devices across a large geographic region.

Packet network 130 comprises multiple network elements such as routers, gateways, switches, servers, processing systems, or other communication equipment and systems for providing communication and data services via data packets. Packet network 130 could comprise Internet routers, network gateways, computer systems, communication links, media gateways, media gateway controllers (MGC), packet inspection equipment, or some other type of communication equipment—including combinations thereof. Packet network 130 may also comprise a Voice over Internet Protocol (VoIP) network, a voice-over-packet network, a wireless communication network, an optical network, an enterprise network, a local area network (LAN), wide area network (WAN), MAN, session initiation protocol (SIP) trunks, or other network topologies, equipment, or systems—including combinations thereof. Packet network 130 may be configured to communicate over metallic, wireless, or optical links. Packet network 130 may be configured to communicate over IP, Ethernet, optical networking, communication signaling, SIP signaling, or some other communication format—including combinations thereof.

Call control system 140 includes equipment for receiving and processing call requests initiated from wireless communication device 101. Call control system 140 comprises a computer system and communication interface. Call control system 140 may also include other components such a router, server, data storage system, and power supply. Call control system 140 may reside in a single device or may be distributed across multiple devices. Call control system 140 may be a discrete system or may be integrated within other systems. In some examples, call control system 140 is located within the same equipment in which packet network 130 is located. Call control system 140 could comprise a session border controller, packet gateway, network gateway system, Internet access node, application server, service node, firewall, or some other communication system—including combinations thereof. Call control system 140 is in communication with home wireless network 150 and authorization system 155 over communication link 151.

Authorization system 155 comprises a computer system and communication interface. Authorization system 155 may also include other components such a router, server, data storage system, and power supply. Authorization system 155 may reside in a single device or may be distributed across multiple devices. Authorization system 155 may be a discrete system or may be integrated within other systems—including other systems within home wireless network 150. Authorization system 155 could comprise an authentication, authorization, and accounting (AAA) server, packet gateway, mobile switching center, network gateway system, Internet access node, application server, service node, firewall, or some other communication system—including combinations thereof.

Communication network 160 comprises multiple network elements such as routers, gateways, telecommunication switches, trunks, exchanges, class 4 switches, class 5 switches, servers, processing systems, or other telecommunications equipment for providing telecommunication services to devices in a geographic area, such as destination device 170 over link 171. Communication network 160 could comprise wireless communication nodes, telephony switches, Internet routers, network gateways, computer systems, communication links, or some other type of communication equipment—including combinations thereof. Communication network 160 may also comprise an optical network, ATM network, packet network, WAN, MAN, public switched telephone network (PSTN), or other network topologies, equipment, or systems—including combinations thereof. Communication network 160 may be configured to communicate over metallic, wireless, or optical links. Communication network 160 may be configured to use TDM, IP, Ethernet, optical networking, wireless protocols, communication signaling, or some other communication format—including combinations thereof. In some examples, communication network 160 comprises a local exchange carrier (LEC) of a PSTN.

Destination communication device 170 comprises hardware and circuitry programmed to function as a telecommunications device. Destination communication device 170 may comprise a communication interface, user interface, memory device, software, processing circuitry, or some other communication components. For example, destination communication device 170 could comprise a telephone, wireless transceiver, mobile phone, cellular phone, smartphone, computer, personal digital assistant (PDA), e-book, game console, mobile Internet device, network interface card, media player, or some communication apparatus—including combinations thereof. In some examples, destination communication device 170 comprises a telephone configured to communicate with a local exchange carrier of the PSTN. In other examples, destination communication device 170 could comprise wireless communication devices comprising Radio Frequency (RF) communication circuitry and an antenna.

Wireless communication link 111 uses the air or space as the transport medium. Wireless communication link 111 may use various protocols, such as CDMA, GSM, UMTS, HSPA, EV-DO, EV-DO rev. A, 3GPP LTE, WiMAX, Wi-Fi, Bluetooth, Internet, telephony, or some other communication format—including combinations thereof. Wireless communication link 111 may comprise many different signals sharing the same link. For example, wireless communication link 111 could include multiple signals operating in a single propagation path comprising multiple communication sessions, frequencies, timeslots, transportation ports, logical transportation links, network sockets, IP sockets, packets, or communication directions—including combinations thereof.

Communication links 121, 131, 141, 151, 161, and 171 use metal, air, space, optical fiber such as glass or plastic, or some other material as the transport media—including combinations thereof. Communication links 121, 131, 141, 151, 161, and 171 could use various communication protocols, such as TDM, IP, SIP, ATM, Ethernet, telephony, optical networking, hybrid fiber coax (HFC), communication signaling, wireless protocols, or some other communication format—including combinations thereof. Communication links 121, 131, 141, 151, 161, and 171 may be direct links or could include intermediate networks, systems, or devices.

Figure 3:
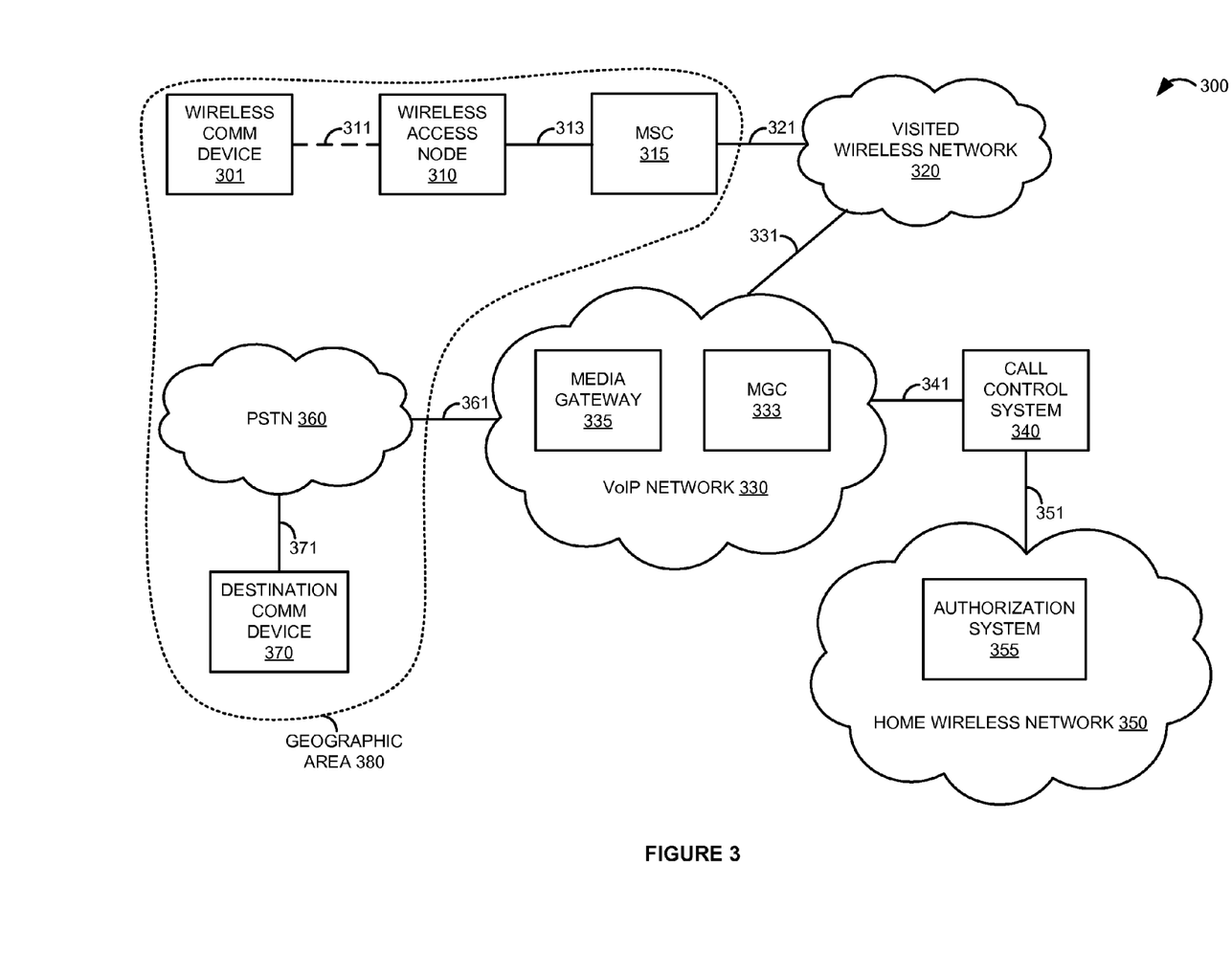
FIG. 3 is a block diagram that illustrates a communication system in an exemplary embodiment.

FIG. 3 is a block diagram that illustrates communication system 300 in an exemplary embodiment. Communication system 300 includes wireless communication device 301, wireless access node 310, mobile switching center (MSC) 315, visited wireless network 320, VoIP network 330, call control system 340, home wireless network 350, public switched telephone network (PSTN) 360, and destination communication device 370. VoIP network 330 includes media gateway controller (MGC) 333 and media gateway 335. Home wireless network 350 includes authentication, authorization, and accounting (AAA) server 355. Wireless communication device 301 in is communication with wireless access node 310 over wireless communication link 311. Wireless access node 310 communicates with MSC 315 over communication link 313. MSC 315 is in communication with visited wireless network 320 over communication link 321. Visited wireless network 320 communicates with VoIP network 330 over communication link 331. VoIP network 330 is in communication with call control system 340 over communication link 341. Call control system 340 communicates with home wireless network 350 and AAA server 355 over communication link 351. VoIP network 330 is in communication with PSTN 360 over communication link 361. PSTN 360 communicates with destination communication device 370 over communication link 371.

Wireless communication device 301, wireless access node 310, MSC 315, and destination communication device 370 are located in a geographic area 380 served by PSTN 360. In the exemplary embodiment of FIG. 3, wireless communication device 301 comprises a dual-mode communication device capable of operating in both third generation (3G) and fourth generation (4G) wireless modes. Further, home wireless network 350 comprises a WiMAX (4G) wireless network and is the home network of wireless communication device 301, while visited wireless network 320 comprises a 1xRTT (3G) wireless network.

Figure 4:
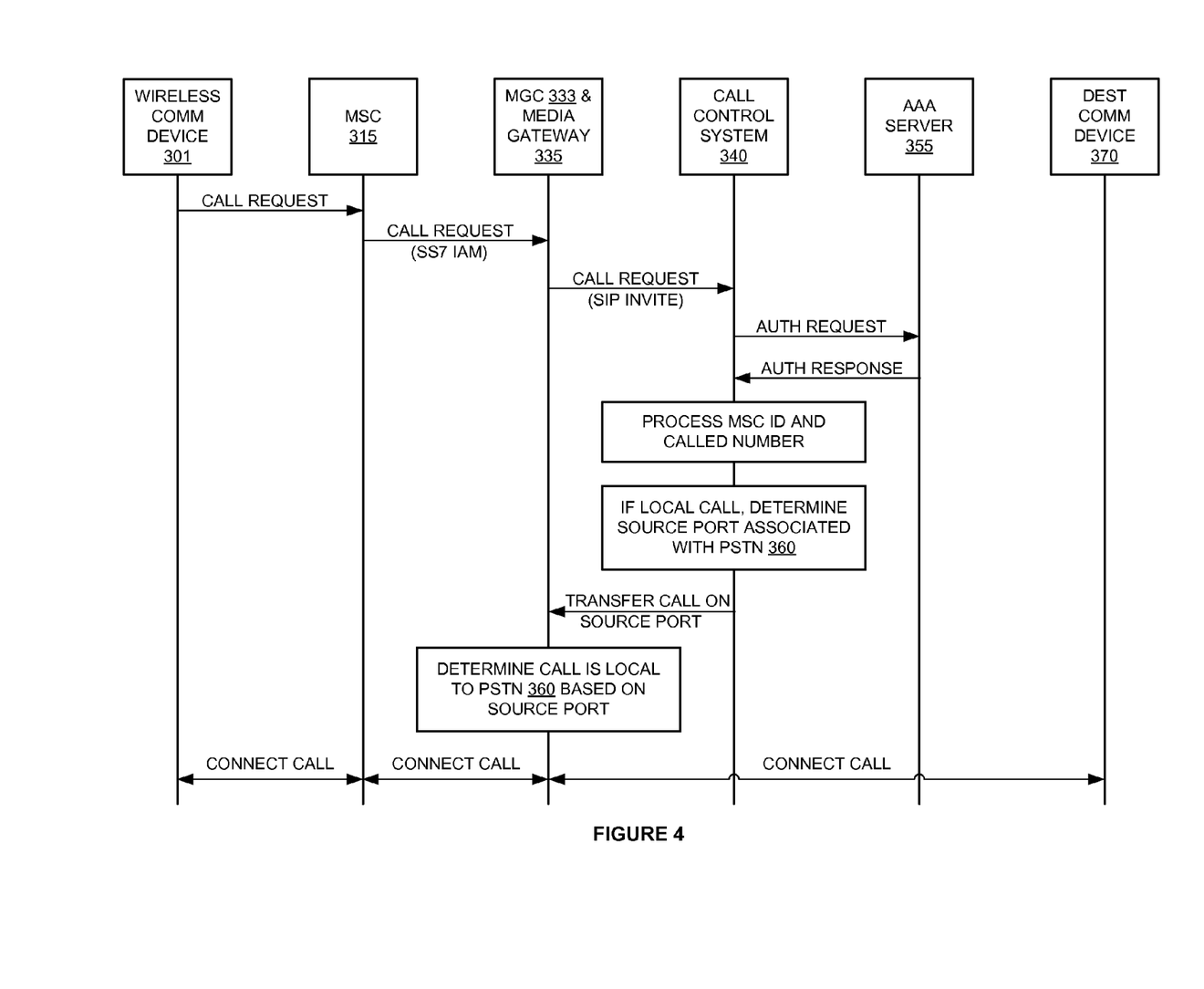
FIG. 4 is a sequence diagram that illustrates an operation of the communication system in an exemplary embodiment.

FIG. 4 is a sequence diagram that illustrates an operation of communication system 300 in an exemplary embodiment. The sequence diagram of FIG. 4 depicts a scenario in which wireless communication device 301 is roaming in visited wireless network 320 and initiates a call to destination communication device 370. In order to call destination communication device 370, wireless communication device 301 transfers a call request to MSC 315 in response to a user of device 301 dialing the telephone number associated with destination device 370.

Upon receiving the call request, MSC 315 transfers the call for delivery to MCG 333 in VoIP network 330 by transferring a call request in a signaling system number 7 (SS7) initial address message (IAM). MGC 333 prepares a SIP invite message and inserts a trunk group identifier (TG-ID), trunk context (RFC 4904), or some other identifier that identifies the origination MSC 315 or wireless access node 310 in order to preserve the location of wireless communication device 301. In some examples, MGC 333 inserts the identifier of MSC 315 into a carrier identification code (CIC) field or a general field of the SIP call signaling. MGC 333 then forwards the SIP invite message to call control system 340.

Call control system 340 transfers an authorization request to AAA server 355 in the form of a RADIUS Access-Request message. Upon receipt of the Access-Request message, AAA server 355 processes user credentials and other information contained in the Access-Request message to authenticate the user of wireless communication device 301 and authorize the user and various features for the call. Upon successful authentication of the user, home AAA server 333 formulates an authorization response message in the form of a RADIUS Access-Accept message.

In formulating the RADIUS Access-Accept message, the location identifier that identifies MSC 315 is preserved in the CIC or other field of the call signaling. Thus, when AAA server 355 transfers the authorization response back to call control system 340, the identifier of MSC 315 is included in the response. Call control system 340 then processes the MSC 315 identifier and the called number to determine whether wireless communication device 301 is located in geographic area 380 served by PSTN 360. To accomplish this determination, call control system 340 refers to a local calling area (LCA) table in a relational database.

Call control system 340 maintains the LCA database that maps all the LCAs to their covered MSCs. Call control system 340 can therefore look up the trunk group ID or other identifier of MSC 315 in the LCA database and search for a match to the NPA of the called number, which is the telephone number associated with destination device 370. If no trunk group ID or other identifier of MSC 315 is included in the response from AAA server 355, call control system 340 assumes the call originated from the 4G home wireless network 350 of wireless communication device 301, and transfers the call to a local commercial mobile radio service (CMRS) trunk. However, in this example, the MSC ID of MSC 315 is included in the response, so call control system 340 is able to determine whether the MSC 315 serving wireless communication device 301 is located in geographic area 380 served by PSTN 360 that serves destination device 370.

Once call control system 340 determines whether wireless communication device 301 is located in geographic area 380 served by PSTN 360, call control system 340 indicates whether the call is local to PSTN 360 by transferring the call on a source port associated with PSTN 360. In this example, call control system 340 determines a specific source port to transfer the call to media gateway 335 which media gateway 335 is configured to identify as a source port associated with PSTN 360. The source port associated with the geographic area 380 served by PSTN 360 may be included as an additional field in the LCA database. However, in some examples, call control system 340 uses a single source port for any local call designation, and a different source port for long distance calls. Since call control system 340 determines that the call is local to PSTN 360 in this example, call control system 340 transfers the call to media gateway 335 on a source port associated with PSTN 360 serving the geographic area 380 in which wireless communication device 301 is presently located.

Media gateway 335 is configured to recognize the call as local to PSTN 360 based on the source port on which call control system 340 transfers the call. For example, media gateway 335 may access a table that relates source ports to LCAs to determine that the source port of call control system 340 on which it received the call is associated with the LCA of PSTN 360. If the source port indicates a long distance call, media gateway 335 routes the call over a feature group D (FG-D) trunk. However, in this case, media gateway 335 routes the call over a CMRS local trunk to PSTN 360 since the source port indicates the call is local to PSTN 360. In this manner, the call is then connected between wireless communication device 301 and destination communication device 370.

Advantageously, although the call traverses VoIP network 330 as it is transferred between visited wireless network 320 and PSTN 360, the location of wireless communication device 301 is preserved by storing an identifier of MSC 315 in the SIP call signaling. Based on the MSC ID and the called number, call control system 340 can determine whether the call should be routed as local or long distance. Call control system 340 can then communicate this information to media gateway 335 by selecting a source port of system 340 that corresponds to the geographic area 380 served by PSTN 360. Media gateway 335 is then able to select the appropriate CMRS local or FG-D trunk for the call based on the source port.

Figure 5:
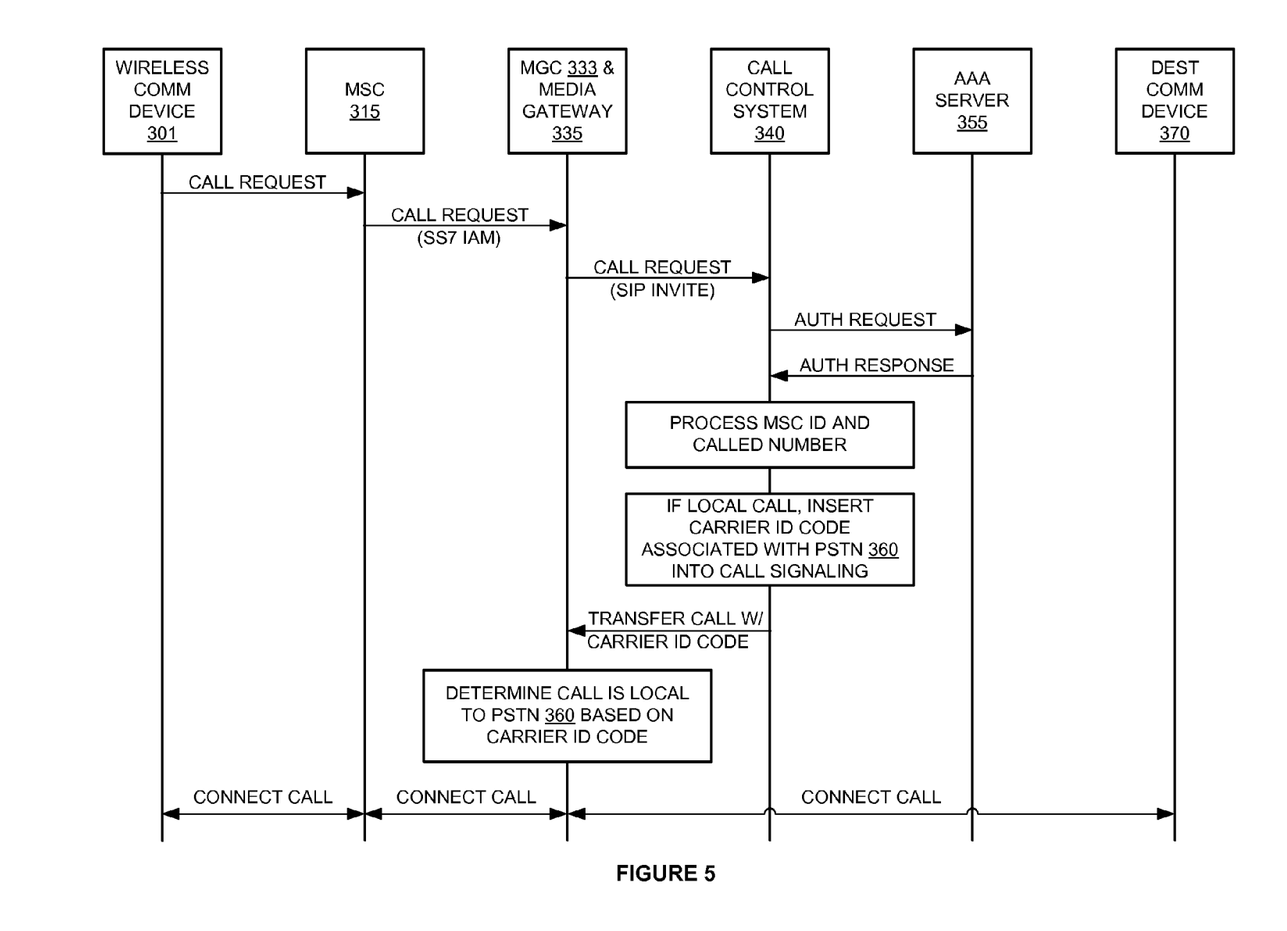
FIG. 5 is a sequence diagram that illustrates an operation of the communication system in an exemplary embodiment.

FIG. 5 is a sequence diagram that illustrates an operation of communication system 300 in an exemplary embodiment. The sequence diagram of FIG. 5 depicts a scenario in which wireless communication device 301 is homed to 4G wireless network 350 but is roaming in visited 3G wireless network 320. Wireless communication device 301 initiates a call to destination communication device 370 in response to a user of device 301 dialing the telephone number associated with destination device 370.

Upon receiving the call request, MSC 315 transfers an SS7 call request to MCG 333. MGC 333 prepares a SIP invite message and inserts a trunk group ID or other identifier of MSC 315 in the carrier identification code (CIC) field of the SIP call signaling as described above. The location of wireless communication device is thus preserved in the call signaling as MGC 333 receives feature authorization from AAA server 355 and as the call traverses VoIP network 330. Thus, when AAA server 355 transfers the authorization response back to call control system 340, the MSC 315 identifier is included in the response. Call control system 340 then processes the MSC 315 identifier and the called number to determine whether wireless communication device 301 is located in geographic area 380 served by PSTN 360.

In this example, once call control system 340 determines whether wireless communication device 301 is located in geographic area 380 served by PSTN 360, call control system 340 indicates whether the call is local to PSTN 360 by including a CIC associated with PSTN 360 into the call signaling. In this case, call control system 340 determines that the call is local to the geographic area 380 served by PSTN 360, and thus inserts a CIC associated with PSTN 360 into the call signaling.

Media gateway 335 is configured to process the CIC field of the call signaling and determine that the call is local to the geographic area 380 served by PSTN 360 based on the information in the CIC field. For example, call control system 340 may store the LCA of PSTN 360 in the CIC field. Thus, in this case, media gateway 335 routes the call over a local CMRS trunk to PSTN 360 since the CIC field indicates the call is local to the geographic area 380 served by PSTN 360. In this manner, the call is then connected between wireless communication device 301 and destination communication device 370 utilizing the local CMRS trunks.

Figure 6:
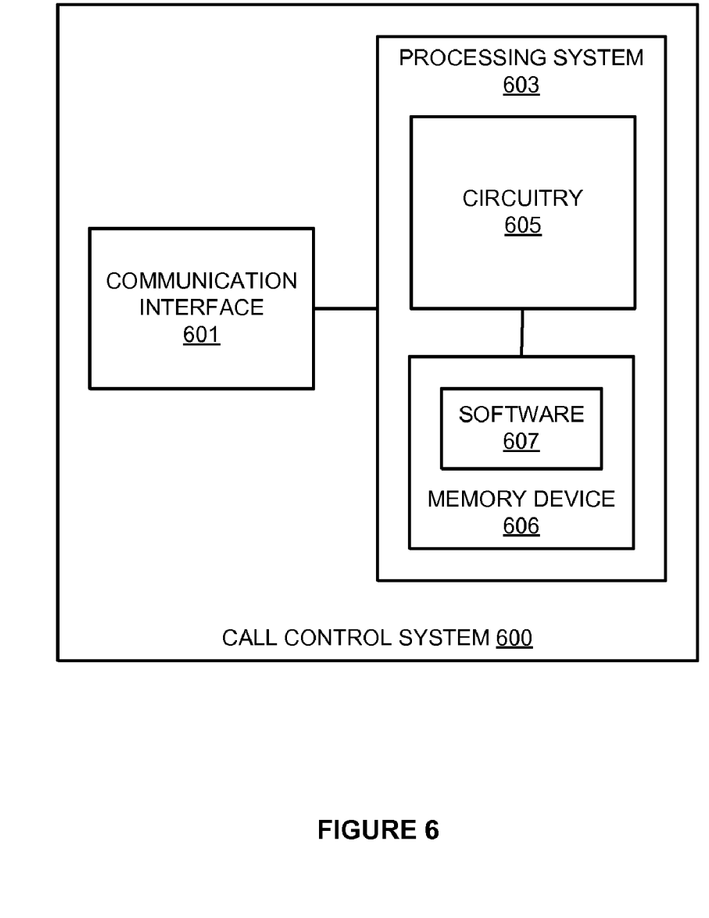
FIG. 6 is a block diagram that illustrates a call control system.

FIG. 6 is a block diagram that illustrates call control system 600. Call control system 600 provides an example of call control systems 140 and 340, although systems 140 and 340 may use alternative configurations. Call control system 600 comprises communication interface 601 and processing system 603. Processing system 603 is linked to communication interface 601. Processing system 603 includes processing circuitry 605 and memory device 606 that stores operating software 607.

Communication interface 601 comprises components that communicate over communication links, such as network cards, ports, RF transceivers, processing circuitry and software, or some other communication components. Communication interface 601 may be configured to communicate over metallic, wireless, or optical links. Communication interface 601 may be configured to use TDM, IP, SIP, Ethernet, optical networking, wireless protocols, communication signaling, or some other communication format—including combinations thereof. Communication interface 601 is configured to receive an authorization response from an authorization system located in a home wireless network of a wireless communication device, wherein the authorization response comprises a destination identifier of a destination communication device and a location identifier of the wireless communication device. Further, communication interface 601 is configured to transfer a call over a source port associated with a geographic area served by a communication network.

Processing circuitry 605 comprises microprocessor and other circuitry that retrieves and executes operating software 607 from memory device 606. Memory device 606 comprises a disk drive, flash drive, data storage circuitry, or some other memory apparatus. Operating software 607 comprises computer programs, firmware, or some other form of machine-readable processing instructions. Operating software 607 may include an operating system, utilities, drivers, network interfaces, applications, or some other type of software. When executed by circuitry 605, operating software 607 directs processing system 603 to operate as described herein for call control systems 140 and 340. In particular, operating software 607 directs processing system 603 to process a destination identifier and a location identifier to determine if a wireless communication device is located in a geographic area served by a communication network. Further, operating software 607 directs processing system 603 to direct communication interface 601 to transfer a call over a source port associated with the geographic area served by the communication network.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A call control system to route a voice over internet protocol call between a wireless communication device and a destination communication device, wherein the destination communication device is located in a geographic area served by a communication network, the call control system comprising:
- a communication interface configured to receive an authorization response from an authorization system located in a home wireless network of the wireless communication device, wherein the authorization response includes a destination identifier of the destination communication device and a location identifier of the wireless communication device;
- a processing system configured to process the destination identifier and the location identifier to determine if the wireless communication device is located in the geographic area served by the communication network; and
- if the wireless communication device is located in the geographic area served by the communication network, the processing system configured to direct the communication interface to transfer the voice over internet protocol call over a source port associated with the geographic area served by the communication network.

2. The system of claim 1 wherein, if the wireless communication device is located in the geographic area served by the communication network, the processing system is configured to include the location identifier in a carrier identification code associated with the voice over internet protocol call.

3. The system of claim 1 further comprising the communication interface configured to receive a call request from a media gateway controller in a session initiation protocol (SIP) call invite message and transfer an authorization request to the authorization system in response to the call request.

4. The system of claim 3 wherein the call request from the media gateway controller comprises the location identifier of the wireless communication device, and wherein the processing system is configured to include the location identifier of the wireless communication device in the authorization request transferred to the authorization system.

5. The system of claim 1 wherein the destination identifier comprises a called number associated with the voice over internet protocol call and wherein the location identifier comprises an identifier of a mobile switching center (MSC) serving the wireless communication device.

6. The system of claim 5 wherein the processing system configured to process the destination identifier and the location identifier to determine if the wireless communication device is located in the geographic area served by the communication network comprises the processing system configured to process the called number and the identifier of the MSC to determine if the MSC serving the wireless communication device is associated with the geographic area served by the communication network.

7. The system of claim 1 wherein the destination identifier comprises a network address of the destination communication device and wherein the location identifier comprises an identifier of a wireless access node serving the wireless communication device.

8. The system of claim 7 wherein the processing system configured to process the destination identifier and the location identifier to determine if the wireless communication device is located in the geographic area served by the communication network comprises the processing system configured to process the network address and the identifier of the wireless access node to determine if the wireless access node serving the wireless communication device is associated with the geographic area served by the communication network.

9. The system of claim 1 wherein the wireless communication device is located outside of a geographic area served by the home wireless network of the wireless communication device when the voice over internet protocol call is initiated.

10. The system of claim 1 wherein the call control system comprises a session border controller.

11. A method of operating a call control system to route a voice over internet protocol call between a wireless communication device and a destination communication device, wherein the destination communication device is located in a geographic area served by a communication network, the method comprising:
- receiving an authorization response from an authorization system located in a home wireless network of the wireless communication device, wherein the authorization response includes a destination identifier of the destination communication device and a location identifier of the wireless communication device;
- processing the destination identifier and the location identifier to determine if the wireless communication device is located in the geographic area served by the communication network; and
- if the wireless communication device is located in the geographic area served by the communication network, transferring the voice over internet protocol call over a source port associated with the geographic area served by the communication network.

12. The method of claim 11 further comprising, if the wireless communication device is located in the geographic area served by the communication network, including the location identifier in a carrier identification code associated with the voice over internet protocol call.

13. The method of claim 11 further comprising receiving a call request from a media gateway controller in a session initiation protocol (SIP) call invite message and transferring an authorization request to the authorization system in response to the call request.

14. The method of claim 13 wherein the call request from the media gateway controller comprises the location identifier of the wireless communication device, and further comprising including the location identifier of the wireless communication device in the authorization request transferred to the authorization system.

15. The method of claim 11 wherein the destination identifier comprises a called number associated with the voice over internet protocol call and wherein the location identifier comprises an identifier of a mobile switching center (MSC) serving the wireless communication device.

16. The method of claim 15 wherein processing the destination identifier and the location identifier to determine if the wireless communication device is located in the geographic area served by the communication network comprises processing the called number and the identifier of the MSC to determine if the MSC serving the wireless communication device is associated with the geographic area served by the communication network.

17. The method of claim 11 wherein the destination identifier comprises a network address of the destination communication device and wherein the location identifier comprises an identifier of a wireless access node serving the wireless communication device.

18. The method of claim 17 wherein processing the destination identifier and the location identifier to determine if the wireless communication device is located in the geographic area served by the communication network comprises processing the network address and the identifier of the wireless access node to determine if the wireless access node serving the wireless communication device is associated with the geographic area served by the communication network.

19. The method of claim 11 wherein the wireless communication device is located outside of a geographic area served by the home wireless network of the wireless communication device when the voice over internet protocol call is initiated.

20. A call control system to route a voice over internet protocol call between a wireless communication device and a destination communication device, wherein the destination communication device is located in a geographic area served by a communication network, the call control system comprising:
- a communication interface configured to receive a call request from a media gateway controller and, in response to the call request, transfer an authorization request to an authorization system located in a home wireless network of the wireless communication device, wherein the call request and the authorization request include a location identifier of the wireless communication device;
- the communication interface configured to receive an authorization response from the authorization system, wherein the authorization response includes a destination identifier of the destination communication device and the location identifier of the wireless communication device, and wherein the destination identifier includes a called number associated with the voice over internet protocol call;
- a processing system configured to process the destination identifier and the location identifier to determine if the wireless communication device is located in the geographic area served by the communication network; and
- if the wireless communication device is located in the geographic area served by the communication network, the processing system configured to direct the communication interface to transfer the voice over internet protocol call over a source port associated with the geographic area served by the communication network.

* * * * *